United States Patent [19]

Kalopissis et al.

[11] 3,894,837

[45] July 15, 1975

[54] DYE COMPOSITION CONTAINING INDOPHENOL FOR KERATINOUS FIBERS AND METHOD USING THE SAME

[75] Inventors: Gregoire Kalopissis, Paris; Andrée Bugaut, Bou Logne-sur-Seine; Francoise Estradier, Paris, all of France

[73] Assignee: Societe Anonyme dite: L'Oreal, Paris, France

[22] Filed: July 27, 1972

[21] Appl. No.: 275,463

Related U.S. Application Data

[63] Continuation-in-part of Ser. No. 100,433, Dec. 21, 1970, abandoned, which is a continuation-in-part of Ser. No. 49,905, June 25, 1970, abandoned.

[30] Foreign Application Priority Data

June 25, 1969 Luxembourg............................ 58954
July 30, 1971 Luxembourg............................ 63641

[52] U.S. Cl. ............................ 8/10; 8/10.1; 8/10.2; 8/11; 260/386 N; 424/DIG. 2; 424/71
[51] Int. Cl............................................. D06p 3/04
[58] Field of Search ............. 8/10.2, 11; 260/386 N; 424/70

[56] References Cited
UNITED STATES PATENTS 3,730,677 5/1973 Kalopissis et al. ...................... 8/10.2

FOREIGN PATENTS OR APPLICATIONS 339,044 9/1904 France............................... 8/10.2 X
157,288 10/1902 Germany ........................... 8/10.2 X
1,078,717 3/1960 Germany ........................... 8/10.2 X
773,794 5/1957 United Kingdom.................... 8/10.2

OTHER PUBLICATIONS

Lange American Perfumer and Cosmetics, 6/1965, Vol. 80, No. 6, pp. 33 to 37.

*Primary Examiner*—Albert T. Meyers
*Assistant Examiner*—Dale R. Ore
*Attorney, Agent, or Firm*—Cushman, Darby & Cushman

[57] ABSTRACT

Hair dye and hair setting lotion compositions contain an indophenol of the formula

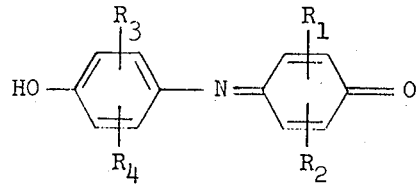

wherein $R_1$, $R_2$, $R_3$ and $R_4$ represent hydrogen, halogen, lower alkoxy and lower alkyl with at least one of $R_1$, $R_2$, $R_3$ and $R_4$ being halogen and the alkaline salts of said indophenol.

7 Claims, No Drawings

DYE COMPOSITION CONTAINING INDOPHENOL FOR KERATINOUS FIBERS AND METHOD USING THE SAME

This application is a continuation-in-part of our application Ser. No. 100,433, filed Dec. 21, 1970, now abandoned which, in turn is a continuation-in-part of our application Ser. No. 49,905 filed June 25, 1970, now abandoned.

The present invention relates to a novel dye composition for keratinous fibers, in particular human hair, comprising a solution in a solvent selected from the group consisting of water and an aqueous solution of a lower alkanol of an indophenol of the formula

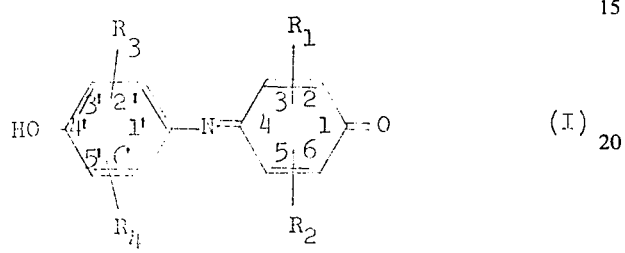

(I)

wherein $R_1$, $R_2$, $R_3$ and $R_4$, each independently represent a member selected from the group consisting of hydrogen, halogen, such as chlorine and bromine, lower alkoxy containing 1-4 carbon atoms and lower alkyl containing from 1 to 4 carbon atoms with the proviso that at least one of $R_1$, $R_2$, $R_3$ and $R_4$ is halogen; or to an alkaline salt of said indophenol such as its ammonium, sodium or potassium salt, and to the tautomers thereof.

The indophenols used in the dye compositions of the present invention can be prepared by condensing in a known manner a paraaminophenol of the formula:

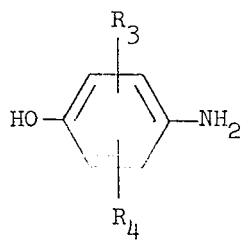

on a phenol of the formula:

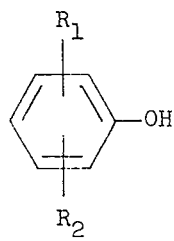

wherein $R_1$, $R_2$, $R_3$ and $R_4$ have the meanings given above. This condensation reaction is performed in an aqueous alkaline medium having, generally, a pH of about 8 to 12, preferably about 10.5 to 11, at a temperature between 0° and 40°C and in the presence of an oxidizing agent such as air, hydrogen peroxide, potassium or ammonium persulfate, sodium hypochlorite or potassium ferricyanide.

The mole ratio of phenol to paraaminophenol ranges between about 0.5:1 to 2:1 and is preferably 1:1. The amount of oxidizing agent can vary between about 1 to 5 times the stoichiometric quantity for oxidizing the paraaminophenol to the corresponding quinone-imine. This amount is preferably equivalent to 1 mol of persulfate or 2 moles of ferricyanide per 1 mol of paraaminophenol.

Alternatively, the said indophenol can be prepared by condensing a paraaminophenol of the formula

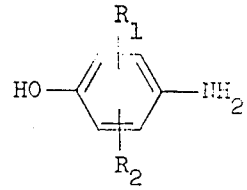

on a phenol of the formula:

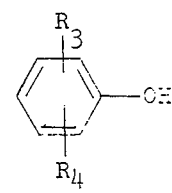

wherein $R_1$, $R_2$, $R_3$ and $R_4$ have the meanings given above under essentially the same conditions outlined immediately above.

The above indophenols can also be prepared by condensing a chlorinated quinone-imine of the formula

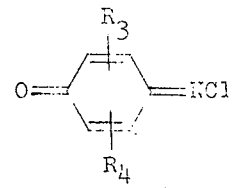

on a phenol of the formula:

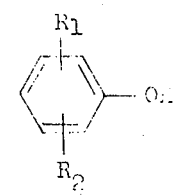

wherein $R_1$, $R_2$, $R_3$ and $R_4$ have the meanings given above in an alkaline medium at a pH of about 10 to 12 and at a temperature of about 10°–40°C. The mole ratio of chlorinated quinone-imine to phenol is preferable 1:1.

As an alternative to this condensation reaction the chlorinated quinone-imine can be of the formula

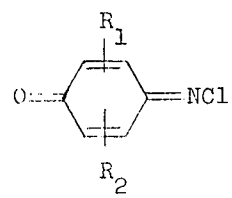

and the phenol can be of the formula

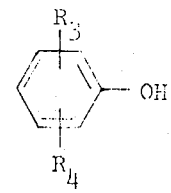

wherein $R_1$, $R_2$, $R_3$ and $R_4$ have the meanings given above. Essentially the same condensation conditions outlined above for the first chlorinated quinoneimine/phenol reaction can be employed.

Representative halogenated indophenols, made in accordance with the above condensation reactions and representative of those usefully employed in the dye compositions of the present invention include:

N-[(4'-hydroxy-2'-chloro)phenyl]-2,6-dimethyl benzoquinoneimine,

N-[(4'-hydroxy-2'-chloro)phenyl]-2,5-dimethyl benzoquinoneimine (new compound),

N-[(4'-hydroxy-3'-chloro)phenyl]-2,5-dimethyl benzoquinoneimine (new compound),

N-[(4'-hydroxy-3'-chloro)phenyl]-2,3-dimethyl benzoquinoneimine (new compound),

N-[(4'-hydroxy-2'-chloro)phenyl]-2,3-dimethyl benzoquinoneimine (new compound),

N-[(4'-hydroxy-3'-chloro)phenyl]-2,6-dimethyl benzoquinoneimine,

N-[(4'-hydroxy-2'-chloro)phenyl]-3-methyl benzoquinoneimine (new compound),

N-[(4'-hydroxy-2'-chloro)phenyl]-3-chloro benzoquinoneimine (new compound),

N-[(4'-hydroxy)phenyl]-3-chloro benzoquinoneimine,

N-[(4'-hydroxy-3'-chloro)phenyl]-3-chloro benzoquinoneimine (new compound),

N-[(4'-hydroxy-3'-chloro)phenyl]-2-chloro benzoquinoneimine (new compound),

N-[(4'-hydroxy-3',5'-dibromo)phenyl] benzoquinoneimine,

N-[(4'-hydroxy-3',5'-dibromo)phenyl] 2-methyl benzoquinoneimine,

N-[(4'-hydroxy-3',5'-dichloro)phenyl]2-methyl benzoquinoneimine,

N-[(4'-hydroxy-3',5'-dichloro)phenyl]-3 methyl benzoquinoneimine,

N-[(4'-hydroxy-3',5'-dibromo)phenyl]-2,6-dimethyl benzoquinoneimine and

N-[(4'-hydroxy-3'-chloro)phenyl]-2,6-di t-butyl benzoquinoneimine.

The new halogenated indophenols mentioned above have the general formula (I) in which $R_1$ and/or $R_2$ represents a methyl or tertiary butyl radical or a hydrogen or chlorine atom, and/or $R_3$ and/or $R_4$ represents a chlorine, bromine or hydrogen atom.

The dye composition of the invention can contain only the indophenols of formula I, in which case it imparts to the fibers treated therewith a frequently pearly appearance and shades of a great variety, which shades are very luminous and rich in glints and include violets, mauves, blues, blue greens, orange yellows, pinks ranging from violet pink to salmon pink, and golden or copper blonds, ash beiges, pink beiges or silver grays.

However, the dye composition of this invention can also of course include one or more conventional hair dyes, for examples, other direct dyes, such as nitro dyes of the benzene series, azo dyes, anthraquinone dyes, oxazines, azines, indoanilines, indamines or other indophenols, such as those set forth in Ser. No. 100,433.

The concentration of the indophenols of this invention in the dye composition of the present invention can range from about 0.002 to 2 percent by weight, preferably about 0.005 and 0.5 percent by weight.

The pH of the dye composition according to the present invention can vary between 4 and 11, and preferably between about 5 and 10. To regulate this pH at the desired value, conventional pH regulators such as an alkalizing agent including ammonia or an amine such as mono-, di- or triethanolamine and an acidifying agent such as acetic acid, lactic acid or phosphoric acid can be used.

The compositions according to the invention can be in the form of purely aqueous solution of said indophenol, especially when the indophenol is present in the form of an alkaline salt thereof. However, the composition of the present invention can also include a lower alkanol such as ethanol or isopropanol, in amounts of about 20–70 weight percent or a glycol, such as propyleneglycol or butylglycol, in an amount of 1 to 6% by weight. These alkanols and glycols facilitate solubilizing said indophenols.

Additionally, the dye composition of the present invention can also include various conventional components usually used in capillary cosmetics, for example, wetting agents, dispersing agents, penetrating agents, swelling agents, thickeners or perfumes. Further, it can be provided in the form of creams or gels or it can be provided in the form of a sprayable aerosol, packaged under pressure in conventional aerosol containers.

Keratin fibers, in particular, human hair, can be dyed with the dye composition of this invention in any conventional manner and usually by applying said composition on the fibers to be dyed and permitting the dye composition to remain in contact with the fibers for about 3 to 30 minutes. Thereafter, the treated fibers are rinsed and, if desired, even washed before drying the same.

As another embodiment of a cosmetic composition of the present invention, there is provided a capillary hair-setting lotion comprising an indophenol as defined above dissolved in an aqueous lower alkanol solution; together with a conventional water- or lower alkanol-soluble cosmetic resin such as polyvinylpyrrolidone having a molecular weight ranging from about 10,000 to 200,000, copolymer of crotonic acid-vinyl acetate, said copolymer having a molecular weight ranging from about 10,000 to 70,000, copolymer of vinylpyrrolidone and vinyl acetate wherein the ratio of VP to VA ranges between 50-70:50-30, said copolymer having a molecular weight ranging from about 30,000 to 200,000 and maleic anhydride-butyl vinyl ether copolymer, a 1% solution of which in methylethyl ketone has a viscosity of 0.1-3.5 cps at 25°C. Obviously, other conventional film-forming cosmetic resins can also be employed. These resins are used in amounts of about 1 to 3 percent by weight of the hair-setting lotion composition.

The alcohols suitable for the preparation of the hair-setting lotions according to the invention are low molecular weight alkanols, such as ethanol or isopropanol which are present in amounts of about 20 to 70% by weight of the total hair-setting lotion composition.

The pH of the hair-setting lotion composition of this invention generally ranges between about 5–8 and can be regulated to the desired value with the alkalizing or acidifying agents set forth above.

The hair-setting lotions of the present invention impart to hair a great variety of hues, as described above, which are characterized by a pearly or iridescent appearance and a great richness of glints. These hair-setting lotions are usually employed by application to wet hair, previously washed and rinsed, followed by rolling the hair up on curlers and drying the hair.

The following examples are given to illustrate the present invention. The temperatures appearing in these examples are expressed in degree centigrade and, unless otherwise specifically stated, all parts and percentages are by weight.

EXAMPLE 1

N-[(4'-hydroxy-2'-chloro)phenyl]-2,6-dimethyl benzoquinoneimine is prepared as follows:

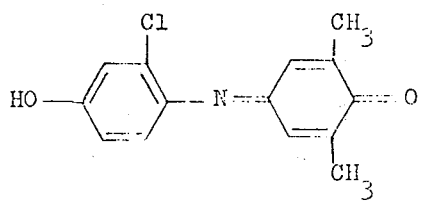

0.35 mole (42.7 g) of 2,6-dimethyl phenol is dissolved in 800 cc of water to which have been added 600 cc of acetone and 530 cc of ammonia at 22°Be. To this resulting solution, cooled in ice, there are added gradually and simultaneously by means of a double funnel with stirring, on the one hand, 0.35 mole (50.2 g) of 3-chloro-4-amino phenol dissolved in 800 cc of water to which have been added 90 cc of hydrochloric acid ($d = 1.19$), and on the other hand, 0.7 mole (160 g) of ammonium persulfate dissolved in 900 cc of water. When the addition is completed, the stirring is continued for 10 minutes. The above indophenol which has precipitated is filtered and washed with 20% aqueous acetone solution. After recrystallization in an acetone-water mixture the above indophenol exhibits a melting point of 195°C. Molecular weight calculated for $C_{14}H_{12}NClO_2$ = 261.5 Molecular weight found by potentiometric determination in acetic acid by perchloric acid = 260.

| Analysis | Calculated for $C_{14}H_{12}NO_2Cl$ | Found | |
|---|---|---|---|
| C% | 64.24 | 64.26 | 64.39 |
| H% | 4.59 | 4.63 | 4.71 |
| N% | 5.35 | 5.46 | 5.39 |
| Cl% | 13.61 | 13.67 | 13.54 |

EXAMPLE 2

N-[(4'-hydroxy-2'-chloro) phenyl]-2,5-dimethyl benzoquinoneimine is prepared as follows:

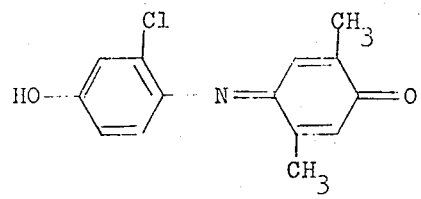

0.04 mole (4.9 g) of 2,5-dimethyl phenol is dissolved in a solution made up of 20 cc of water, 50 cc of acetone and 40 cc of ammonia at 22°Be. To this resulting solution, cooled in ice, there are added gradually, with stirring and simultaneously by means of a double funnel, on the one hand 0.04 mole (5.72 g) of 3-chloro-4-amino phenol dissolved in 80 cc of water to which have been added 10 cc of hydrochloric acid ($d = 1.19$), and on the other hand, 0.08 mole (18.24 g) of ammonium persulfate in 60 cc of water. When the addition is completed, stirring is continued for 10 minutes. The above indophenol which has precipitated is then filtered and washed with a 20% aqueous acetone solution. After recrystallization in an acetone-water mixture and drying under a vacuum, the above indophenol exhibits a melting point of 182°C.

| | | |
|---|---|---|
| Molecular weight calculated for $C_{14}H_{12}NClO_2$ = | | 261.5 |
| Molecular weight found by potentiometric determination in dimethylformamide with an 0.1 N tetra-n-butylammonium (TBA) hydroxide solution in a methanol/isopropanol mixture (O,1N TBA mixture)= | | 263. |
| Analysis | Calculated for $C_{14}H_{12}NClO_2$ | Found |
| C% | 64.24 | 64.27 64.18 |
| H% | 4.59 | 4.67 4.64 |
| N% | 5.35 | 5.23 5.29 |

EXAMPLE 3

N-[(4'-hydroxy-3'-chloro)phenyl]-2,5-dimethyl benzoquinoneimine is prepared as follows:

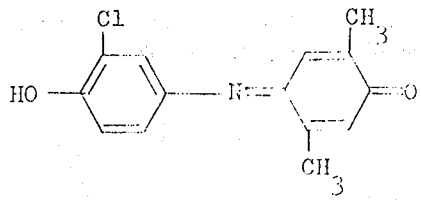

There are dissolved, on the one hand, 0.01 mole (1.80 g) of 2-chloro 4-amino phenol hydrochloride and, on the other hand, 0.01 mole (1.22 g) of 2,5-dimethyl phenol in 25 cc of water to which have been added 15 cc of acetone and 6 cc of ammonia at 22°Be. To this resulting solution, previously cooled in ice, there is gradually added, with stirring, 0.02 mole (4.60 g) of ammonium persulfate dissolved in 15 cc of water. When the addition is completed, stirring is continued for 15 minutes. The above indophenol which has precipitated, is filtered, washed with a 30% aqueous acetone solution and dried under vacuum. The above indophenol exhibits a melting point of 167°C.

| | | | |
|---|---|---|---|
| Molecular weight calculated for $C_{14}H_{12}NClO_2$ = | | | 261.5 |
| Molecular weight found by potentiometric determination in dimethylformamide by 0.1 N TBA = | | | 264. |
| Analysis | Calculated for $C_{14}H_{12}NClO_2$ | Found | |
| C% | 64.24 | 64.53 | 64.28 |
| H% | 4.59 | 4.44 | 4.57 |
| N% | 5.35 | 5.46 | 5.40 |

EXAMPLE 4

N-[(4'-hydroxy-3'-chloro)phenyl]-2,3-dimethyl benzoquinoneimine is prepared as follows:

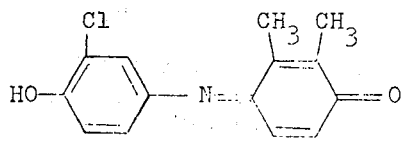

On the one hand, 0.01 mole (1.80 g) of 2-chloro-4-amino phenol hydrochloride and, on the other hand, 0.01 mole (1.22 g) of 2,3-dimethyl phenol are dissolved in 25 cc of water to which have been added 15 cc of acetone and 6 cc of ammonia at 22°Be. To this resulting solution, previously cooled in ice, there is added gradually, with stirring, 0.02 mole (4.60 g) of ammonium persulfate dissolved in 15 cc of water. When the addition is completed, stirring is continued for 30 minutes. The above indophenol, in the form of dark green crystals, is filtered, washed with a 50% aqueous acetone solution and dried for 3 days under vacuum. 1.6 g of this chromatographically pure product, which melts at 186°C, are thus obtained.

| Molecular weight calculated for $C_{14}H_{12}NClO_2$ = | | 261.5 |
| Molecular weight found by potentiometric determination in dimethylformamide by 0.1 N TBA = | | 260. |
| Analysis | Calculated for $C_{14}H_{12}NClO_2$ | Found |
| --- | --- | --- |
| C% | 64.24 | 64.17  64.36 |
| H% | 4.59 | 4.62  4.67 |
| N% | 5.35 | 5.47  5.26 |

EXAMPLE 5

N-[(4'-hydroxy-2'-chloro)phenyl]-2,3-dimethyl benzoquinoneimine is prepared as follows:

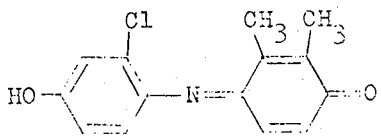

On the one hand, 0.01 mole (1.43 g) of 3-chloro-4-amino phenol and, on the other hand, 0.01 mole (1.22 g) of 2,3-dimethyl phenol are dissolved in 25 cc of water, 25 cc of acetone and 6 cc of ammonia at 22°Be. To this resulting solution, previously cooled in ice, there is gradually added, with stirring, 0.02 mole (4.60 g) of ammonium persulfate dissolved in 15 cc of water. When the addition is completed, stirring is continued for 10 minutes. The above indophenol, which has precipitated is filtered and washed with a 50% aqueous acetone solution. After recrystallization in a dimethylformamide-water mixture and drying under vacuum, the product (2.5 g) melts at 230°C.

| Molecular product calculated for $C_{14}H_{12}NClO_2$ = | | 261.5 |
| Molecular weight found by potentiometric determination in dimethylformamide by 0.1 N TBA = | | 263. |
| Analysis | Calculated for $C_{14}H_{12}NClO_2$ | Found |
| --- | --- | --- |
| C% | 64.24 | 64.14  64.30 |
| H% | 4.59 | 4.66  4.62 |
| N% | 5.35 | 5.27  5.29 |

EXAMPLE 6

N-[(4'-hydroxy-2'-chloro)phenyl]-2,3-dimethyl benzoquinoneimine is prepared in an alternative process as follows:

On the one hand, 0.01 mole (1.76 g) of 3-chloro quinonechloroimide is dissolved in 15 cc of acetone and, on the other hand, 0.01 mole (1.22 g) of 2,3-dimethyl phenol is dissolved in 10 cc of acetone and 10 cc of a normal soda solution. These two resulting solutions, previously cooled to 0°, are then mixed and the reaction mixture is left at this temperature for 30 minutes. The above indophenol which precipitates is then filtered, washed with a 50 percent aqueous acetone solution and dried under vacuum. The indophenol made in accordance with this alternate procedure exhibits a melting point of 230°C and there is not observed a drop in its melting point when used in mixture with the indophenol prepared in Example 5.

EXAMPLE 7

N-[(4'-hydroxy-3'-chloro)phenyl]—2,6-dimethyl benzoquinoneimine is prepared as follows:

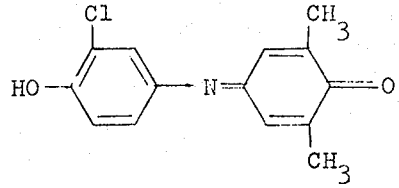

0.15 mole (18.3 g) of 2,6-dimethyl phenol is dissolved in 375 cc of water to which have been added 225 cc of ammonia at 22°Be. To this resulting solution, cooled in ice, there are gradually added, with stirring and simultaneously by means of a double funnel, on the one hand, 0.15 mole (27 g) of 2-chloro-4-amino phenol hydrochloride in 300 cc of water and, on the other hand, 0.3 mole (98.7 g) of potassium ferricyanide in 300 cc of water. When the addition is completed, stirring is continued for 15 minutes. 25 g of the above indophenol, in the form of its ammonium salt precipitate and are filtered, washed with a little ammoniacal liquor and dried.

These 25 g of ammonium salt are then introduced into 90 cc of ethanol to which have been added 2.4 cc of acetic acid, with stirring. After 15 minutes of stirring, 19 g of the above indophenol, which melts at 164°, precipitate and are filtered, washed with a little ethanol and dried under vacuum.

| Molecular weight calculated for $C_{14}H_{12}NClO_2$ = | | 261.5 |
| Molecular weight found by potentiometric determination in acetic acid by perchloric acid = | | 264 |
| Analysis | Calculated for $C_{14}H_{12}NClO_2$ | Found |
| --- | --- | --- |
| C% | 64.24 | 64.14  64.18 |
| H% | 4.59 | 4.61  4.60 |
| N% | 5.35 | 5.25  5.32 |
| Cl% | 13.61 | 13.58  13.49 |

EXAMPLE 8

N-[(4'-hydroxy-2'-chloro)phenyl]-3-methyl benzoquinoneimine is prepared as follows:

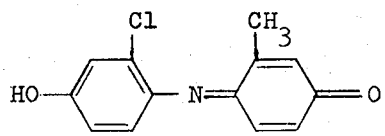

On the one hand, 0.02 mole (3.52 g) of 3-chloro quinonechloroimide is dissolved in 25 cc of acetone and, on the other hand, 0.02 mole (2.16 g) of metacresol is dissolved in 20 cc of a 0.5 N soda solution. To the metacresol solution, previously cooled to 0°, there is gradually added the acetone solution of 3-chloro quinonechloroimide. When the addition is completed, the reaction medium rapidly takes on a royal blue coloring. Then 5 cc of a 4 N soda solution is added to it, thereby precipitating the above indophenol in the form of its crystallized sodium salt. This precipitate is filtered, then washed first with a very slight amount of salt water and subsequently with acetone and then dried under vacuum. This salt (2.1 g) is then dissolved in water. After acidification of the resulting solution with acetic acid, the above indophenol which precipitates is filtered, washed with water and dried under vacuum. It is chromatographically pure and melts at 178°C.

| | | | |
|---|---|---|---|
| Molecular weight calculated for $C_{13}H_{10}NO_2Cl$ = | | | 247.5 |
| Molecular weight found by potentiometric determination in dimethylformamide with 0.1 N solution of tetra-n-butylammonium (TBA) hydroxide in a methanol-isopropanol mixture = | | | 251 |
| Analysis | Calculated for $C_{13}H_{10}NO_2Cl$ | Found | |
| C% | 63.03 | 63.19 | 62.98 |
| H% | 4.04 | 3.95 | 4.06 |
| N% | 5.65 | 5.59 | 5.61 |

EXAMPLE 9

N-[(4'-hydroxy-2'-chloro)phenyl]-3-chloro benzoquinoneimine is prepared as follows:

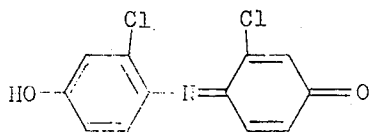

On the one hand, 0.02 mole (3.52 g) of 3-chloro quinone chloroimide is dissloved in 15 cc of acetone and, on the other hand, 0.02 mole (2.57 g) of metachlorophenol is dissolved in 20 cc of a 0.5 N soda solution. To the soda solution of metachlorophenol, previously cooled to 0°, there is gradually added the acetone solution of 3-chloro quinonechloroimide. When the addition is completed, the reaction mixture rapidly takes on a blue coloring. Then, 5 cc of a 4 N soda solution is immediately added to it, thereby precipitating the above indophenol in the form of its crystallized sodium salt. This salt is then filtered, washed with acetone and dried under vacuum. This salt is then dissolved in water and after acidification of the resulting solution with acetic acid, the above indophenol which has precipitated is filtered, washed with water and dried under vacuum. It is chromatographically pure and melts at 170°C.

| | |
|---|---|
| Molecular weight calculated for $C_{12}H_7NO_2Cl_2$ = | 268 |
| Molecular weight found by potentiometric determination in dimethylformamide with a 0.1 N tetra-n-butylammonium (TBA) hydroxide in a methanol/isopropanol mixture = | 272 |

EXAMPLE 10

N-[(4'-hydroxy)phenyl]-3-chloro benzoquinoneimine is prepared as follows:

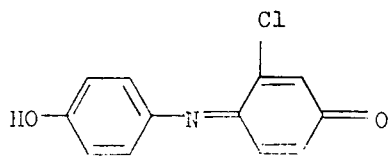

0.01 mole (1.28 g) of metachlorophenol is dissolved in 10 cc of a 3.5 N soda solution. To this solution, cooled to −15°, there are added with stirring and simultaneously by means of a double funnel, on the one hand, 0.01 mole (1.45 g) of paraaminophenol hydrochloride, and on the other hand, 50 cc of a solution of sodium hypochlorite (d = 1.05) at French chlorometric 10°. When the addition is completed, the reaction mixture is at −5°. The sodium salt of the above indophenol which has precipitated is immediately filtered, washed with acetone and dried under vacuum, yielding 0.84 g of this salt. Then this salt is dissolved in water. After acidification of the resulting solution with acetic acid, the above indophenol which has precipitated is filtered, washed with water and dried under vacuum. It is chromatographically pure and melts at 168°C.

| | | | |
|---|---|---|---|
| Molecular weight calculated for $C_{12}H_8O_2NCl$ = | | | 233.5 |
| Molecular weight found by potentiometric determination in dimethylformamide with 0.1 N solution of tetra-n-butylammonium (TBA) hydroxide in a methanol/isopropanol mixture = | | | 233 |
| Analysis | Calculated for $C_{12}H_8O_2NCl$ | Found | |
| C% | 61.67 | 61.90 | 61.84 |
| H% | 3.42 | 3.46 | 3.49 |
| N% | 5.99 | 6.07 | 6.10 |

EXAMPLE 11

N-[(4'-hydroxy-3'-chloro)phenyl]-3-chloro benzoquinoneimine is prepared as follows:

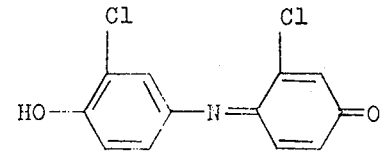

On the one hand, 0.01 mole (1.76 g) of 3-chloro quinonechloroimide is dissolved in 10 cc of acetone and, on the other hand, 0.01 mole (1.28 g) of orthochlorophenol is dissolved in 10 cc of acetone and 12 cc of a normal soda solution. To the acetone solution of 3-chloro quinonechloroimide, previously cooled to 0°, there is gradually added, with stirring, the soda solution of orthochlorophenol. The stirring is continued for 30 minutes and the reaction medium is then saturated with sodium chloride. The sodium salt of the above indophenol in crystallized form is then filtered and washed with acetone, yielding 2.5 g of dry product which is chromatographically pure. This salt is then dissolved in water. After acidification of the resulting solution with acetic acid, the above indophenol which has precipitated is filtered, washed with water and recrystallized with an acetone-water mixture. After drying under vacuum, it exhibits a melting point of 192°C.

| | |
|---|---|
| Molecular weight calculated for $C_{12}H_7NO_2Cl_2$ = | 268 |
| Molecular weight found by potentiometric determination in dimethylformamide with a 0.1 N solution of tetra-n-butylammonium (TBA) hydroxide in an isopropanol/methanol mixture = | 272 |

EXAMPLE 12

N-[(4'-hydroxy-3'-chloro)phenyl]-2-chloro benzoquinoneimine is prepared as follows:

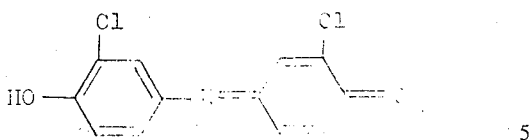

0.015 mole (1.72 g) of o-chlorophenol is dissolved in 15 cc of a normal soda solution to which have been added 5 cc of acetone. This iced solution is then added, with stirring, to 0.01 mole (1.76 g) of 2-chloro quinonechloroimide partially dissolved in 8 cc of acetone. The stirring is continued for 30 minutes. Then 2 cc of a 2 N soda solution and 1.5 g of sodium chloride are added. The sodium salt of the above indophenol precipitates immediately in the form of mordore green crystals which are then filtered, washed with acetone and dried, yielding 1.7 g of chromatographically pure product. This salt is then dissolved in water. After acidification of the resulting solution with acetic acid, the above indophenol which has precipitated is filtered, washed with water and recrystallized in an acetone-water mixture. After drying under vacuum, it melts at 138°C.

| | Calculated for $C_{12}H_7NO_2Cl_2$ | Found | |
|---|---|---|---|
| Molecular weight calculated for $C_{12}H_7NO_2Cl_2$ = | 268 | | |
| Molecular weight found by potentiometric determination in dimethylformamide with a 0.1 N isopropanol/methanol solution of tetra-n-butylammonium (TBA) hydroxide = | | 274 | |
| Analysis | | | |
| C% | 53.73 | 53.59 | 53.68 |
| H% | 2.61 | 2.71 | 2.58 |
| N% | 5.23 | 5.17 | 5.29 |

EXAMPLE 13

The potassium salt of N-[(4'-hydroxy-3'-chloro)phenyl]-2,6-ditertiobutyl benzoquinoneimine is prepared as follows:

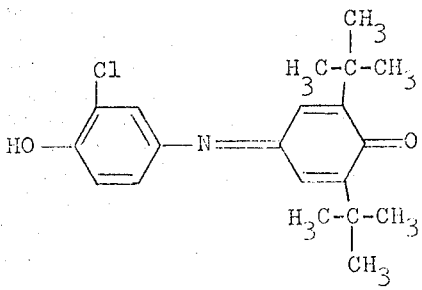

0.005 mole (1.03 g) of ditertiobutyl phenol is dissolved in 10 cc of isopropanol to which have been added 10 cc of a normal potassium solution. This iced solution is added, with stirring, to 0.0075 mole (1.32 g) of 2-chloroquinone chloroimide partially dissolved in 6 cc of isopropanol. Stirring is continued for 30 minutes and the reaction mixture is filtered to eliminate the 2-chloroquinonechloroimide which has not reacted. There are then added to the filtrate 20 cc of a 2 N potassium solution and 2 g of potassium chloride in solution in 10 cc of water. The potassium salt of the above indophenol crystallizes immediately. It is then filtered, washed initially with a little water to which has been added potassium chloride and then with acetone. The product is chromatographically pure.

EXAMPLE 14

The sodium salt of N-[(4'-hydroxy-3'-5'-dibromo)phenyl]-2,6-dimethyl benzoquinoneimine is prepared as follows:

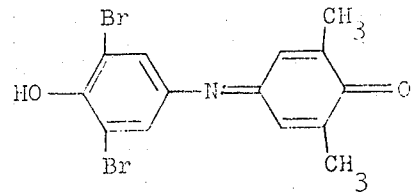

0.05 mole (6.1 g) of 2,6-dimethyl phenol is dissolved in 130 cc of a 2 N soda solution. To this solution, cooled in an ice-salt mixture, there are added over a 45 minute period, with good stirring and simultaneously, with the aid of a double funnel, on the one hand, 0.05 mole (13.35 g) of 4-amino-2,6-dibromo phenol in solution in 200 cc of 0.5 N hydrochloric solution and, on the other hand, 0.05 mole of 97% ammonium persulfate (11.75 g) in solution in 50 cc of water. Stirring is continued for 30 minutes while keeping the temperature in the vicinity of 0°. The sodium salt of the above indophenol precipitates and is filtered. After washing the same with a little water and then with acetone, the product is chromatographically pure.

EXAMPLE 15

The following hair dye composition is prepared:

| | |
|---|---|
| Dye of Example 1 | 0.05 g |
| Ethyl alcohol, 96° titer | 25 g |
| Water, q.s.p. | 100 g |
| Ammonia at 22°Be, q.s.p. | pH 8 |

This hair dye composition when applied for 20 minutes to 95 percent naturally white hair, imparts thereto, after rinsing and shampooing, a pearly beige shade with pink glints.

EXAMPLE 16

The following hair-setting lotion composition is prepared:

| | |
|---|---|
| Dye of Example 1 | 0.1 g |
| Vinyl acetate-crotonic acid copolymer (vinyl acetate, 90%, crotonic acid 10%, molecular weight 45,000 to 50,000) | 2 g |
| Ethyl alcohol, 96° titer | 50 g |
| Water, q.s.p. | 100 g |
| Ammonia at 22°Be, q.s.p. | pH 5 |

This hair-setting lotion when applied to bleached hair, imparts thereto a very luminous golden salmon shade.

EXAMPLE 17

The following hair dye composition is prepared:

| | |
|---|---|
| Dye of Example 2 | 0.1 g |
| Ethyl alcohol, 96° titer | 25 g |
| Water, q.s.p. | 100 g |
| Ammonia at 22°Be, q.s.p. | pH 9.5 |

This hair dye composition when applied for 20 minutes to 95% naturally white hair, imparts thereto, after rinsing and shampooing a pearly tamarisk pink shade.

EXAMPLE 18

The following hair dye composition is prepared:

| Dye of Example 2 | 0.025 g |
|---|---|
| Ethyl alcohol, 96° titer | 40 g |
| Water, q.s.p. | 100 g |
| Ammonia at 22°Be, q.s.p. | pH 10 |

This hair dye composition when applied for 20 minutes to bleached hair, imparts thereto after rinsing and shampooing a pearly light blond shade with pink glints.

EXAMPLE 19

The following hair-setting lotion is prepared:

| Dye of Example 2 | 0.05 g |
|---|---|
| Vinyl acetate-crotonic acid copolymer (90% vinyl acetate, 10% crotonic acid, molecular weight 45,000 to 50,000) | 2 g |
| Isopropyl alcohol, 96° titer | 50 g |
| Water, q.s.p. | 100 g |
| Triethanolamine, q.s.p. | pH 7 |

This hair-setting lotion when applied to bleached hair, imparts thereto a pearly salmon pink shade.

EXAMPLE 20

The following hair dye composition is prepared:

| Dye of Example 3 | 0.4 g |
|---|---|
| Isopropyl alcohol, 96° titer | 40 g |
| Water, q.s.p. | 100 g |
| Ammonia at 22°Be, q.s.p. | pH 7 |

This hair dye composition when applied for 5 minutes to 95 percent naturally white hair, imparts thereto, after rinsing and shampooing, a pearly pink beige shade.

EXAMPLE 21

The following hair-setting lotion is prepared:

| Dye of Example 3 | 0.1 g |
|---|---|
| Vinyl acetate-crotonic acid copolymer (90% vinyl acetate, 10% crotonic acid, molecular weight 45,000 to 50,000) | 2 g |
| Ethyl alcohol, 96° titer | 50 g |
| Water, q.s.p. | 100 g |
| Triethanolamine, q.s.p. | pH 7 |

This hair-setting lotion when applied to bleached hair, imparts thereto a very luminous salmon pink shade.

EXAMPLE 22

The following hair-setting lotion is prepared:

| Dye of Example 3 | 0.01 g |
|---|---|
| Vinyl acetate-crotonic acid copolymer (as in Example 21) | 2 g |
| Ethyl alcohol, 96° titer | 50 g |
| Water, q.s.p. | 100 g |
| Triethanolamine, q.s.p. | pH 7 |

This hair-setting lotion when applied to bleached hair, imparts thereto a pink champagne shade.

EXAMPLE 23

The following hair dye composition is prepared:

| Dye of Example 4 | 0.2 g |
|---|---|
| Butylglycol | 5 g |
| Lauryl alcohol oxyethylenated with 10.5 moles of ethylene oxide | 5 g |
| Water, q.s.p. | 100 g |

This hair dye composition when applied for 20 minutes to bleached hair, imparts thereto, after rinsing and shampooing a pearly pale pink shade.

EXAMPLE 24

The following hair-setting lotion is prepared:

| Dye of Example 5 | 0.1 g |
|---|---|
| Vinyl acetate-crotonic acid copolymer (90% vinyl acetate, 10% crotonic acid, molecular weight 45,000 to 50,000) | 2 g |
| Ethyl alcohol, 96° titer | 50 g |
| water, q.s.p. | 100 g |
| Ammonia at 22°Be, q.s.p. | pH 8 |

This hair-setting lotion when applied to bleached hair, imparts thereto a pearly pink shade with mauve glints.

EXAMPLE 25

The following hair dye composition is prepared:

| Dye of Example 6 | 0.1 g |
|---|---|
| Ethyl alcohol, 96° titer | 40 g |
| Water, q.s.p. | 100 g |
| Ammonia at 22°Be, q.s.p. | pH 10 |

This hair dye composition when applied to bleached hair for 20 minutes, imparts thereto, after rinsing and shampooing a pearly pale pink shade.

EXAMPLE 26

The following hair-setting lotion is prepared:

| Dye of Example 7 | 0.05 g |
|---|---|
| Vinyl acetate-crotonic acid copolymer (90% vinyl acetate, 10% crotonic acid, molecular weight 45,000 to 50,000) | 2 g |
| Ethyl alcohol, 96° titer | 50 g |
| Water, q.s.p. | 100 g |
| Ammonia at 22°Be, q.s.p. | pH 9 |

This hair-setting lotion when applied to bleached hair, imparts thereto, a golden apricot shade.

EXAMPLE 27

The following hair dye composition is prepared:

| Dye of Example 3 | 0.1 g |
|---|---|
| Nitroorthophenylenediamine | 0.025 g |
| N-[(4'-amino-3',5'-dimethyl-2'-methoxy)phenyl]-2,6-dimethyl benzoquinone-imine | 0.05 g |
| Ethyl alcohol, 96° titer | 25 g |
| Ammonia at 22°Be, q.s.p. | pH 9 |

This hair dye composition when applied for 20 minutes to 95 percent naturally white hair, imparts thereto, after rinsing and shampooing, a golden light bronze shade.

EXAMPLE 28

The following hair dye composition is prepared:

| | |
|---|---|
| Dye of Example 2 | 0.08 g |
| N-[4'-amino-3',5'-dimethyl-2'-methoxy)phenyl]-2,5-dimethyl benzoquinone-imine | 0.08 g |
| N-[(6'-hydroxy-1'-oxa-4'-aza-1',2',3',4'-tetrahydro)-7'-naphthyl]-3-methoxy benzoquinonediimine monohydrate | 0.16 g |
| Ethyl alcohol, 96° titer | 40 g |
| Water, q.s.p. | 100 g |
| Ammonia at 22°Be, q.s.p. | pH 9.5 |

This hair dye composition when applied for 20 minutes to 95 percent naturally white hair, imparts thereto, after rinsing and shampooing, a light silvery bluish gray coloration.

EXAMPLE 29

The following hair-setting lotion is prepared:

| | |
|---|---|
| Dye of Example 4 | 0.087 g |
| Nitrometaphenylenediamine | 0.025 g |
| 7-diethylamino-3-dimethylimino-3H-phenoxazine perchlorate | 0.012 g |
| Vinyl acetate-crotonic acid copolymer (90% vinyl acetate, 10% crotonic acid, molecular weight 45,000 to 50,000) | 2 g |
| Ethyl alcohol, 96° titer | 50 g |
| Water, q.s.p. | 100 g |
| Triethanolamine, q.s.p. | pH 7 |

This hair-setting lotion when applied to bleached hair, imparts thereto an ash gray shade.

EXAMPLE 30

The following hair dye composition is prepared:

| | |
|---|---|
| Indophenol of Example 11 | 0.25 g |
| Ethyl alcohol, 96° titer | 40 g |
| Water, q.s.p. | 100 g |
| Ammonia at 22°Be, q.s.p. | pH 9 |

This hair dye composition when applied to 95 percent naturally white hair for 20 minutes, imparts thereto, after rinsing and shampooing, a silver gray shade.

This same hair dye composition, when applied to bleached hair for 5 minutes, imparts thereto after rinsing and shampooing, a silver light blue shade.

EXAMPLE 31

The following hair dye composition is prepared:

| | |
|---|---|
| Indophenol of Example 12 in the form of its sodium salt | 0.1 g |
| Water, q.s.p. | 100 g |
| Ammonia at 22°Be, q.s.p. | pH 10 |

This hair dye composition when applied for 10 minutes to bleached hair, imparts thereto after rinsing and shampooing, a turquoise blue coloring.

EXAMPLE 32

The following hair dye composition is prepared:

| | |
|---|---|
| Indophenol of Example 8 in the form of its sodium salt | 0.1 g |
| Water, q.s.p. | 100 g |

The pH of this hair dye composition is 9.5.

This hair-dye composition when applied for 20 minutes to bleached hair, imparts thereto, after rinsing and shampooing, a very luminous intense violet pink coloring.

This same hair-dye composition when applied for 20 minutes to 95 percent naturally white hair, imparts thereto, after rinsing and shampooing, a pearly pink beige shade.

EXAMPLE 33

The following hair-setting lotion is prepared:

| | |
|---|---|
| Indophenol of Example 9 in the form of its sodium salt | 0.025 g |
| Vinyl acetate-crotonic acid copolymer (90% vinyl acetate, 10% crotonic acid, molecular weight 45,000 to 50,000) | 2 g |
| Ethyl alcohol, 96° titer | 50 g |
| Water, q.s.p. | 100 g |
| Triethanolamine, q.s.p. | pH 7.5 |

This hair-setting lotion when applied to bleached hair, imparts thereto a very light pearly pink beige shade.

EXAMPLE 34

The following hair dye composition is prepared:

| | |
|---|---|
| Indophenol of Example 10 in the form of its sodium salt | 0.15 g |
| Water, q.s.p. | 100 g |

This hair dye composition, which has a pH of 9.5, when applied for 20 minutes to 95 percent naturally white hair, imparts thereto, after rinsing and shampooing, a rosewood coloring.

EXAMPLE 35

The following hair-dye composition is prepared:

| | |
|---|---|
| Indophenol of Example 8 | 0.1 g |
| Isopropyl alcohol, 96° titer | 30 g |
| Water, q.s.p. | 100 g |
| Ammonia, at 22°Be, q.s.p. | pH 9.5 |

This hair dye composition when applied for 20 minutes to 95 percent naturally white hair, imparts thereto, after rinsing and shampooing, a pearly ash blond coloring.

EXAMPLE 36

The following hair dye composition is prepared:

| | |
|---|---|
| Indophenol of Example 9 in the form of its sodium salt | 0.05 g |
| Water, q.s.p. | 100 g |

This hair dye composition, which has a pH of 9, when applied for 20 minutes to bleached hair, imparts thereto after rinsing and shampooing, a pearly glycine shade.

This same hair dye composition, when applied for 20 minutes to 95 percent naturally white hair, imparts thereto, after rinsing and shampooing, a mauve iridescent beige coloring.

EXAMPLE 37

The following hair-setting lotion is prepared:

| | |
|---|---|
| Dye of Example 7 in the form of its ammonium salt | 0.1 g |
| Vinyl acetate-crotonic acid copolymer (as in Example 33) | 2 g |
| Ethyl alcohol, 96° titer | 30 g |
| Water, q.s.p. | 100 g |
| Ammonia at 22°Be, q.s.p. | pH 9 |

This hair-setting lotion when applied to 95% naturally white hair, imparts thereto a pink beige shade.

EXAMPLE 38

The following hair-setting lotion is prepared:

| | |
|---|---|
| Dye of Example 13 in the form of its potassium salt | 0.2 g |
| Vinyl acetate-crotonic acid copolymer (as in Example 33) | 2 g |
| Ethyl alcohol, 96° titer | 40 g |
| Water, q.s.p. | 100 g |
| Triethanolamine, q.s.p. | pH 7.5 |

This hair-setting lotion when applied to 95% naturally white hair, imparts thereto a very luminous copper blond shade.

EXAMPLE 39

The following hair dye composition is prepared:

| | |
|---|---|
| Dye of Example 14 in the form of its sodium salt | 0.4 g |
| Water, q.s.p. | 100 g |
| Ammonia at 22°Be, q.s.p. | pH 9.5 |

This hair dye composition when applied for 20 minutes to 95 percent naturally white hair, imparts thereto, after rinsing and shampooing, a silver gray blue shade.

What is claimed is:

1. A dye composition for human hair comprising a solution in a solvent selected from the group consisting of water and an aqueous solution of a lower alkanol selected from the group consisting of ethanol and isopropanol wherein said lower alkanol is present in amounts of about 20 to 70 percent by weight of said composition of an indophenol selected from the group consisting of a. an indophenol of the formula

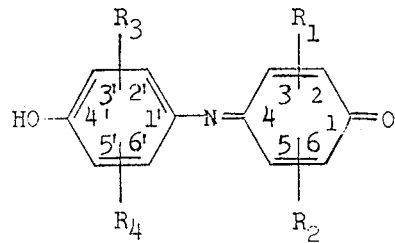

wherein $R_1$, $R_2$, $R_3$ and $R_4$, each independently, represent a member selected from the group consisting of halogen selected from the group consisting of chlorine and bromine, hydrogen, lower alkoxy having 1–4 carbon atoms and lower alkyl having 1–4 carbon atoms with the proviso that at least one of $R_1$, $R_2$, $R_3$ and $R_4$ is said halogen; and b. an alkaline salt of the indophenol in (a) selected from the group consisting of the ammonium, sodium and potassium salt thereof; said indophenol being present in amounts of 0.002 to 2 percent by weight of said composition.

2. The composition of claim 1 having a pH between 4 and 11.

3. The composition of claim 1 which also includes a glycol selected from the group consisting of propylene glycol and butyl glycol in amounts of about 1–6 percent by weight of said composition.

4. The composition of claim 1 which also includes a film-forming cosmetic resin in amounts of 1 to 3 percent by weight of said composition, said film forming resin being selected from the group consisting of polyvinylpyrrolidone having a molecular weight ranging from about 10,000 to 200,000, copolymer of crotonic acid and vinyl acetate having a molecular weight ranging from about 10,000 to 70,000, copolymer of vinylpyrrolidone and vinyl acetate wherein the ratio of VP to VA ranges between 50–70:50–30, said copolymer having a molecular weight ranging from about 30,000 to 200,000 and maleic anhydride-butyl vinyl ether copolymer, a 1 percent solution of which in methylethylketone has a viscosity of 0.1–3.5 cps at 25°C.

5. The composition of claim 4 having a pH between 5 and 8.

6. A process of dyeing human hair comprising impregnating the hair with a dye composition as defined in claim 1, permitting said composition to remain in contact with said hair for a period of 3 to 30 minutes, rinsing said hair with water and drying said hair.

7. A process for setting human hair which comprises impregnating wet hair with a composition according to claim 4 and then rolling said hair up on curlers and drying said hair.

* * * * *